Patented May 1, 1945

2,374,789

UNITED STATES PATENT OFFICE 2,374,789

ORGANIC PEROXIDE

Franklin Strain, Barberton, Ohio, assignor to Pittsburgh Plate Glass Company, Pittsburgh, Pa., a corporation of Pennsylvania No Drawing. Application March 21, 1944, Serial No. 527,487

5 Claims. (Cl. 260—463)

This application relates to a new class of peroxy compounds and methods for preparing them. The new compounds are alkyl carbonates wherein one of the alkyl groups is separated from the carbonate radical by a peroxy oxygen atom.

One of the purposes of the invention is to provide a new group of liquid peroxide compounds for use as polymerization catalysts. A further purpose is to provide liquid percarbonate compounds which are stable to heat and percussion, thereby eliminating the danger of explosion during use.

This new group of compounds has the structural formula as follows:

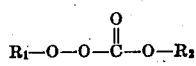

wherein $R_1$ and $R_2$ are alkyl radicals. The groups $R_1$ and $R_2$ may be the same or different alkyl radicals.

The new compounds are prepared by reacting an alkyl hydroperoxide with an alkyl chloroformate in the presence of a basic agent such as pyridine or an oxide or hydroxide of an alkaline metal. The reaction is preferably conducted in the presence of sodium hydroxide and at a temperature below about 10° C. The alkyl hydroperoxide and the alkyl chloroformate are each cooled separately and then combined. The sodium hydroxide is then added gradually at a rate sufficient to enable the maintenance of the reaction temperature below a prescribed maximum, usually less than 15° C. An ice bath is necessary to dissipate the heat of reaction and rapid stirring is desirable to prevent local excesses in temperature and the incident losses of yield. After the reactants have been combined the mixture should be stirred for about 15 minutes to insure completion of the reaction. The liquid peroxide compound separates from the aqueous liquor on standing. It is removed and subsequently washed and dried. The new group of compounds are colorless liquids which are very stable to heat and percussion, most of them being capable of distillation. They are effective polymerization catalysts for ethylenic compounds. They are useful in bleaching operations and other oxidation reactions.

Further details of the preparation and use of the new peroxy compounds are set forth in the following specific examples:

Example I

A mixture of 198 g. of 50 percent tertiary butyl hydroperoxide and 138 g. of isopropyl chloroformate were mixed and cooled to −8° C. With constant stirring, a cold 10 percent solution of sodium hydroxide was added slowly at a rate sufficient to maintain the reaction temperature below 3° C. The reaction vessel was submerged in a bath containing a mixture of salt and ice. After the reagents had been combined, the stirring was continued for 20 minutes. The two liquid phases of the reaction mixture were then separated. The nonaqueous portion was washed with dilute hydrochloric acid and with water and then dried over anhydrous sodium sulfate. The liquid peroxy carbonate was distilled at 63° C. and 2 to 3 mm. pressure. A colorless liquid compound was thereby obtained.

A 10 g. sample of diallyl phthalate was mixed with 0.4 g. of t-butylperoxy isopropyl carbonate and heated for 5 hours at 90° C. A hard colorless resin was thereby formed.

Example II

A mixture of 61 g. of 50 percent ethyl hydroperoxide was mixed with 54 g. of ethyl chloroformate and cooled to approximately −10° C. The mixture was stirred vigorously and the reaction vessel submerged in an ice bath. 125 cc. of a 20 percent solution of sodium hydroxide is added slowly at a rate sufficient to prevent the increase in temperature to above 0° C. When the reagents were entirely combined 25 cc. of ether were added. The nonaqueous layer containing ether and percarbonate was separated and washed with dilute hydrochloric acid and water until neutral. The ether and percarbonate were separated from each other by distillation.

A 10 g. sample of ethylene glycol bis (allyl carbonate) was mixed with 0.5 g. of ethyl peroxyethyl carbonate and heated at 60° C. for 72 hours. A hard transparent polymer was formed.

Although the invention has been described with respect to certain specific embodiments it is not intended that the details thereof should be construed as limitations upon the scope of the invention.

I claim:

1. A compound having the molecular structure:

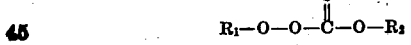

in which $R_1$ and $R_2$ are alkyl radicals.

2. As a new compound t-butylperoxy isopropyl carbonate.

3. As a new compound ethylperoxy isopropyl carbonate.

4. As a new compound ethylperoxy ethyl percarbonate.

5. A method of preparing an alkylperoxy alkyl carbonate which comprises reacting an alkyl hydroperoxide and an alkyl chloroformate in the presence of an alkaline reagent at a temperature below 20° C.

FRANKLIN STRAIN.